United States Patent [19]

Cooney

[11] 4,148,034
[45] Apr. 3, 1979

[54] RADIO DIRECTION FINDING SYSTEM

[76] Inventor: John R. Cooney, R.F.D. 3, Waldoboro, Me. 04572

[21] Appl. No.: 789,368

[22] Filed: Apr. 21, 1977

[51] Int. Cl.² ............................ G01S 1/40; G01S 3/54
[52] U.S. Cl. ......................... 343/106 D; 343/113 DE; 343/118
[58] Field of Search ............ 343/113 DE, 106 D, 118

[56] References Cited

U.S. PATENT DOCUMENTS

| | | | |
|---|---|---|---|
| 2,861,264 | 11/1958 | Lair | 343/113 DE X |
| 3,094,697 | 6/1963 | Kramar et al. | 343/106 D |
| 3,670,337 | 6/1972 | Earp et al. | 343/106 D X |
| 3,778,831 | 12/1973 | Marchand | 343/113 DE X |

Primary Examiner—Maynard R. Wilbur
Assistant Examiner—Richard E. Berger
Attorney, Agent, or Firm—Kenway & Jenney

[57] ABSTRACT

A radio direction finding system including a transmitter and associated antenna located at one end of a radio communication path and a receiver and associated antenna at the other end. One of the antennas is characterized by an omni-directional pattern. The other antenna is characterized by a rotating, directional antenna pattern which is periodically reversed in direction at a rate low compared to its rotation frequency, but high compared to changes in bearing occurring between the transmitter and receiver. The periodic modulation of the RF signal caused by the rotating antenna pattern is detected by the receiver which generates a demodulated output signal. This demodulated signal is averaged over a period including the two directions of antenna rotation, with the result that the bearing error portions cancel, yielding a bearing-indicating signal which is relatively free from receiver-introduced phase error.

5 Claims, 4 Drawing Figures

RADIO DIRECTION FINDING SYSTEM

BACKGROUND OF THE DISCLOSURE

The field of this invention is radio communications systems, and more particularly, systems for radio direction finding.

One form of prior art system utilizes a radio frequency (RF) transmitter and receiver located at opposite ends of a radio communication path, with a continuously rotating directional antenna located at either the transmitting or receiving end of the path, and an omni-directional antenna located at the other end. A reference signal is provided at the receiving end of the path to identify a particular point (such as North) in the cycle of the rotating antenna. The rotating antenna causes a periodic modulation of the RF signal (AM, or FM, or a combination of both), and this modulation is detected by the receiver. The demodulated output signal provided by the receiver is periodic at the rotational frequency of the antenna, with the phase of that output signal relative to that of the reference signal being a measure of the relative bearing of the receiver and transmitter locations. In known prior art systems, the rotating antenna may be physically rotated (as by a motor), or alternatively, with a multiple element configuration, the elements may remain fixed with the pattern rotated by an electronic modulating arrangement.

One problem encountered by the prior art radio direction finding systems is bearing indication error due to phase shift introduced by the receiver. The usual remedy in such systems is a phase adjustment provided in the receiver to offset the characteristic phase delay for the particular receiver. In general, the characteristic phase shift varies with the individual receivers, and thus each receiver must be separately adjusted. When the antenna rotational frequency is low, (such as 30 Hz of the so-called Omnirange systems) relatively easily compensated delays in the audio circuits are generally the only consideration. However, if the antenna rotational frequency is high, and approaches the bandwidth of the receiver, compensation poses a much more difficult problem, particularly if the transmitter center-frequency deviates somewhat from its nominal value. Under such conditions, the time delay (caused primarily by characteristics of the IF filters) suffered by the intelligence-bearing side bands of the RF signal generally varies with various system parameters such as receiver tuning. These variations can easily be substantial compared with the rotational period of the antenna, thereby leading to correspondingly high error in the bearing indication. Since the frequency-determining components (e.g. crystals) of both the transmitter and receiver are necessarily provided with certain tolerances with regard to center-frequency, even in the most rigidly controlled communication systems, this source of error may become substantial.

Thus, in the prior art radio direction finding systems, variations in a number of factors can cause substantial errors due to receiver introduced phase shift, with such errors not always being easily predicted or corrected. One such factor is the variation in tuning of either the transmitter or receiver from the exact "center-frequency" (the variation may be dependent upon temperature, power supply, or simply arise because two different transmitters or receivers happen to be tuned within their specified tolerances but slightly differently). A second factor contributing such error is variation in the rotational frequency of the antenna (such as might be due to temperature, or power supply variation).

A third source of error lies in the tuning and adjustment of the receiver audio filters or other circuits, which may be affected by temperature, power supply, aging so that frequent re-calibration is required.

It is an object of the present invention to provide a radio direction finding system which minimizes the effect of receiver-introduced phase shift.

It is another object of the present invention to provide a radio system for producing a bearing indication which is substantially free from error due to receiver-introduced phase shift.

SUMMARY OF THE INVENTION

According to the present invention, a radio direction finding system includes a transmitter and a receiver located at opposite ends of a radio communication path. In one form of the invention, the transmitter includes a rotating directional antenna and the receiver includes an omni-directional antenna. In an alternative form, the transmitter includes an omni-directional antenna and the receiver includes a rotating directional antenna. In both of these forms, the directional antenna includes a means to periodically reverse the direction of rotation of that antenna at a rate low compared to its rotation frequency, but high compared to changes in bearing occurring between the transmitter and receiver.

A reference signal is provided at the receiving end of the path to identify a particular point of the rotational cycle of the rotating antenna. The periodic modulation of the RF signal caused by the rotation of the antenna is detected by the receiver which generates a demodulated output signal. This demodulated signal provides a measure of the relative bearing of the receiver and transmitter locations.

In operation, for each of the two directions of antenna rotation, the receiver site processing system produces a bearing signal which includes bearing error, but the error portions from each direction of rotation are equal in magnitude and have opposite polarities. The present system averages the bearing indicating signals for the two directions of antenna rotation, with the result that the bearing error portions cancel, yielding a bearing-indicating signal which is relatively free from receiver-introduced phase error.

As a consequence, the configuration of the present invention is relatively immune to variations in transmitter or receiver tuning, as well as variations in the rotational frequency of the antenna and in the tuning and adjustment of receiver filters and other circuits.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
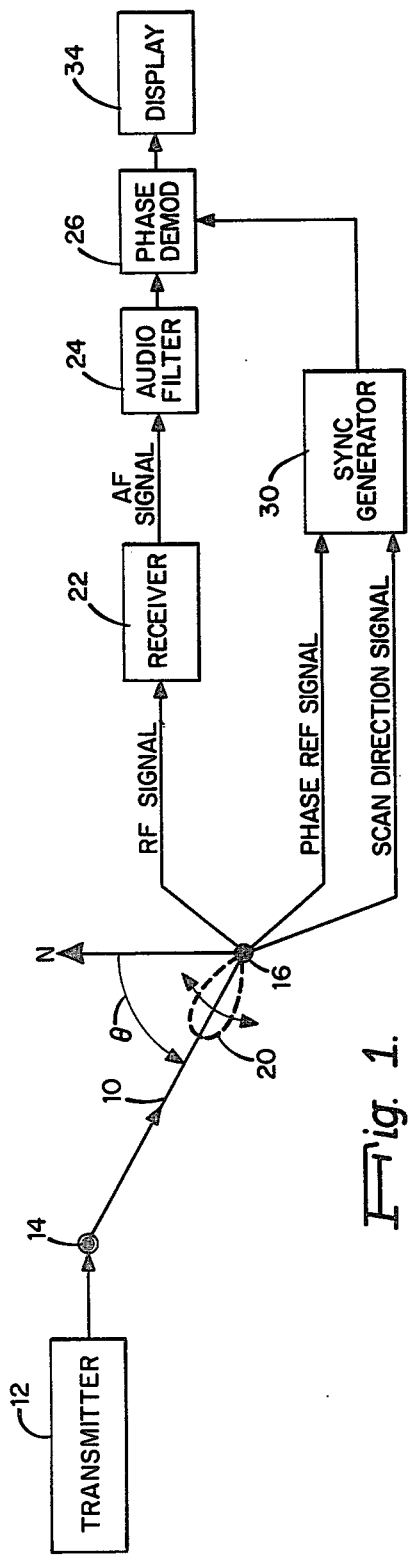
FIGS. 1 and 2 show, in block diagram form, radio direction finding systems in accordance with the present invention.
Figure 2:
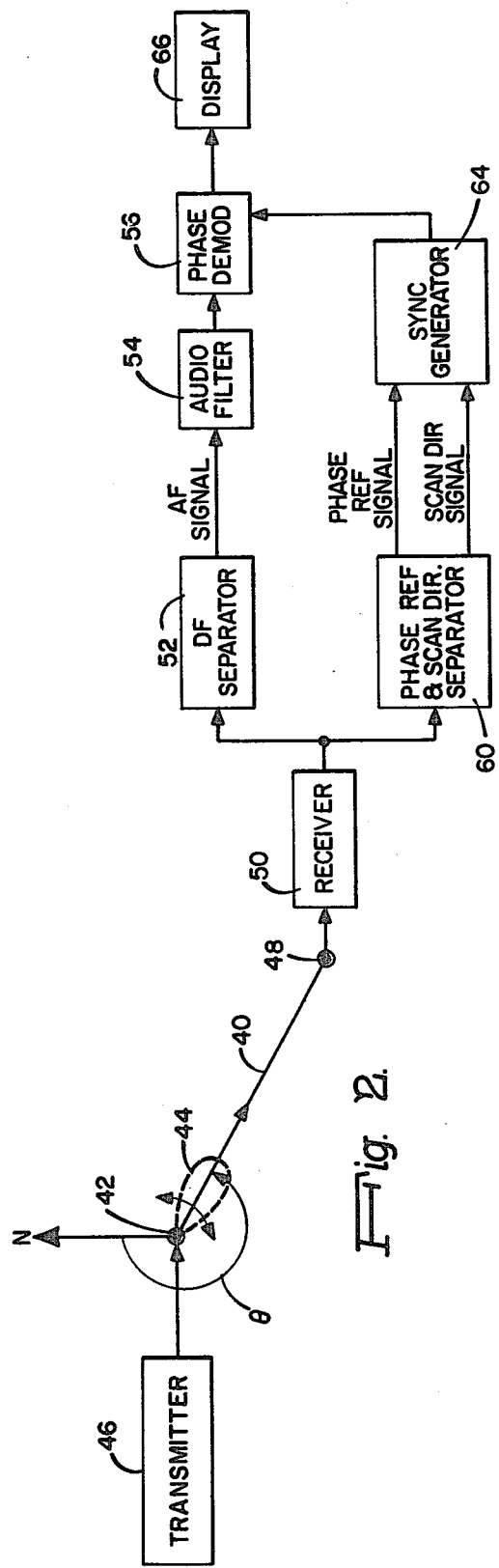

FIGS. 1 and 2 illustrate alternative configurations for the present invention. In FIG. 1, a radio communication link 10 is established between a transmitting antenna 14 and associated transmitter 12 and a receiving antenna 16. The antenna 14 is characterized by substantially omni-directional radiation pattern, and the antenna 16 is characterized by a directional pattern (indicated by the dotted line 20). The antenna 16 is adapted to rotate its characteristic pattern 20 in a manner whereby the direction of rotation is periodically reversed at a rate relatively low compared to the angular velocity. The angle $\theta$ denotes the current angular position of the pattern 20 relative to a reference direction N (North). The antenna 16 further includes a generator for producing a periodic phase reference signal at the frequency of rotation of the antenna and having a fixed time relationship to the rotational position of the pattern 20. The form of the phase reference signal may vary for different embodiments. For example, this signal may be a pulse signal, as described more fully below in conjunction with the operation of the FIG. 1 configuration. In other embodiments, such as in the FIG. 2 configuration, the phase reference signal may be sinusoidal to minimize bandwidth requirements over the communications link between the transmitters and receiving antennas.

In the FIG. 1 configuration, the antenna 16 also includes a generator for producing a scan direction signal which is representative of the current direction of rotation of the antenna 16, i.e. clockwise or counter-clockwise as shown in the figures. The antenna 16 further provides an RF signal which corresponds to the RF signal received from the transmitter 12 by way of antenna 14 and link 10, as modulated by the rotating of the directional pattern of antenna 16.

The RF signal received at antenna 16 is applied to receiver 22. In the illustrated embodiment, receiver 22 is an AM receiver which detects the modulation to provide a phase modulated signal at the frequency ($f_a$) of rotation of the antenna 16. The phase modulated signal is applied to a bandpass filter 24 which is tuned to $f_a$. The filtered phase modulated signal is in turn applied to a phase demodulator 26. The phase reference signal and scan direction signal are applied to a sync generator 30 which provides the sampling signals for the phase demodulator 26. Demodulator 26 provides a demodulated output signal which is representative of the relative bearing of antenna 14 with a respective antenna 16. This output signal in the present embodiment is applied to a display 34. By way of example, the display may comprise a continuous resolving type display, either in a two-phase or four-phase form, with an associated integrating, or averaging, network to filter out signal variations due to the periodic reversal of antenna rotation direction. Alternative display means may be used.

The configuration of FIG. 2 is similar to that of FIG. 1 except that a communication link 40 is established between a rotating directional antenna 42 (characterized by the directional radiation pattern 44, and driven by transmitter 46) and a substantially omni-directional antenna 48 at the receiver site. In the FIG. 2 configuration, the direction of rotation of the pattern 44 of antenna 42 is periodically reversed at a frequency which is relatively low compared with the rate of rotation of that pattern, in the same manner as the rotating antenna 16 of the FIG. 1 configuration. The antenna 42 also includes an associated omni-directional radiating element which is driven by transmitter 46 to provide a phase reference signal (bearing a fixed time relationship to the antenna position) and a signal representative of the current direction of rotation of the rotating element of antenna 42. The current direction signal and phase reference signal may use the same or a different carrier but are provided in a conventional manner so that they may be readily separated at the receiver site. In alternative embodiments, the phase reference and direction of rotation signals may be transmitted by way of the rotating element of antenna 42.

The omni-directional antenna 48 receives both the RF signal generated by the rotating element of antenna 42 and also the current direction and phase reference signals from the omni-directional element, and applies these signals to a receiver 50.

In the illustrated embodiment, receiver 50 is coupled to an associated direction finding (DF) signal separator and FM detector 52 which produces a phase modulated signal at the frequency ($f_a$) of rotation of the rotating element of antenna 42. The phase modulated signal is applied to a bandpass filter 54 which is tuned to $f_a$ and whose output is in turn applied to a phase demodulator 56. The receiver 50 also is coupled to a phase reference and current rotation direction signal separator 60 which provides output signals representative of the phase reference signal and current rotation direction signal to a sync generator 64. The sync generator 64 and phase demodulator 56 operate in a manner similar to the sync generator 30 and phase demodulator 26 of the FIG. 1 configuration, and to provide a bearing signal which may be applied to a display 66 (which may function in the same manner as display 34).

In both configurations, with the rotating antenna directed in a counter-clockwise direction, the output signal from the audio filter is proportional to cos ($wt + \theta + \alpha$), where $w = 2\pi f_a$, $\theta$ equals the relative bearing of the transmitter with respect to the reference direction N, and $\alpha$ corresponds to the phase delay introduced by the radio receiver and bandpass filter. During the time period when the rotating antenna is directed in a clockwise rotation, the bandpass filter output signal is proportional to cos ($wt - \theta + \alpha$). When the periods of the counter-clockwise and clockwise rotations are equal, the phase demodulator produces an output signal from the phase demodulator which may be averaged over an integral number of cycles of antenna direction switching so that the phase delay $\alpha$ introduced by the receiver and bandpass filter exactly cancels. For a resolver type display, the vertical coil is driven by a signal proportional to cos ($\theta + \alpha$) + cos ($\theta - \alpha$), or cos$\theta$cos$\alpha$, and the horizontal coil is driven by a signal proportional to sin ($\theta + \alpha$) + sin ($\theta - \alpha$), or sin$\theta$cos$\alpha$, with the result that the resolver pointer exactly indicates the angle $\theta$, regardless of the phase shift $\alpha$ introduced by the receiver. The magnitude of the vertical and horizontal force components on the pointer (i.e. the forces that hold the pointer in place) is thus proportional to cos$\alpha$, which is a maximum at $\alpha = 0$. Consequently, the system of the present invention may be adjusted for maximum performance by introducing a compensating phase delay to the reference signal to match the expected, or measured, delay $\alpha$ for the receiver.

Figure 3:
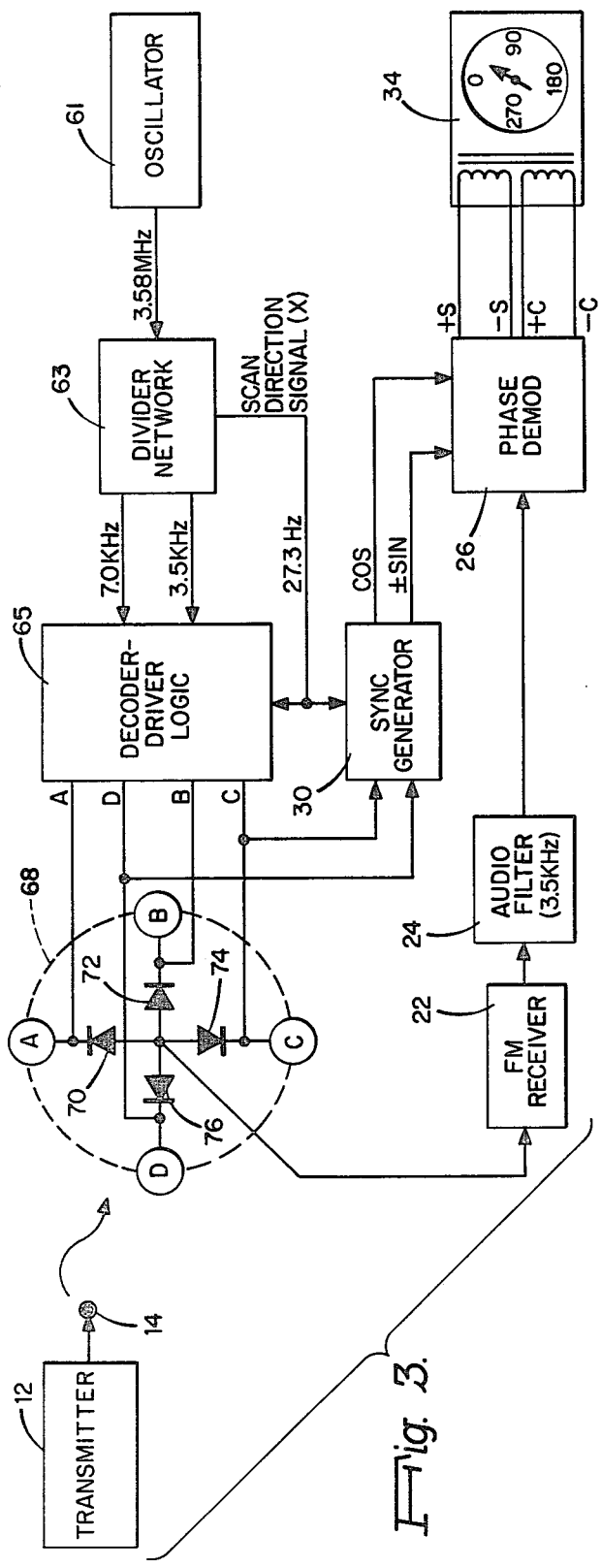
FIG. 3 shows in detailed block diagram form, a receiver station for the system of FIG. 1.

FIG. 3 illustrates in detailed block diagram form an alternative form exemplary receiver site station suitable for use in conjunction with a transmitter providing an RF signal in the Marine Band 156–163 MHz. By way of example, receiver 22 may comprise a VHF/FM model no. 655, manufactured by Hy-Gain Electronics Corporation, Lincoln, Nebraska. The antenna 16 comprises four quarter wave stub antenna elements, equally spaced around the circumference of a reference circle 68 and mounted on a ground plane formed by four horizontal reflector elements. The quarter wave stub elements are denoted in FIG. 3 by the encircled reference designations A, B, C and D. The four element antenna is adapted to provide a directional pattern which rotates at 3.5 KHz, by selectively gating the four stub elements to be active for equal periods in a continuous sequence around the circle 68. With any one antenna element activated, the other three elements are relatively transparent to an arriving wave front.

The characteristic pattern for antenna system 16 is effectively rotated by the electronic switching arrangement shown in FIG. 3 and which comprises a crystal oscillator 61, divider network 63, decoder-driver logic 65, and PIN diodes 70, 72, 74 and 76. In the illustrated embodiment, the PIN diodes are type MPN 3401, manufactured by Motorola Semiconductor Products, Inc., Phoenix, Arizona. The oscillator 61 provides a 3.58 MHz signal which is divided down by divider network 63 to form squarewave signals at 7.0 KHz, 3.5 KHz, and 27.3 Hz. The squarewave signals are applied to decoder-driver logic 65 which provides a sequence of 71 $\mu$sec gating pulses to the switching diodes 70, 72, 74 and 76 such that the stub elements are successively gated on in the order A, B, C and D for a first period and then successively turned on in the order D, C, B, A for a second period. The 27.3 Hz signal defines two periods to be 18.3 msec in duration.

Figure 4:
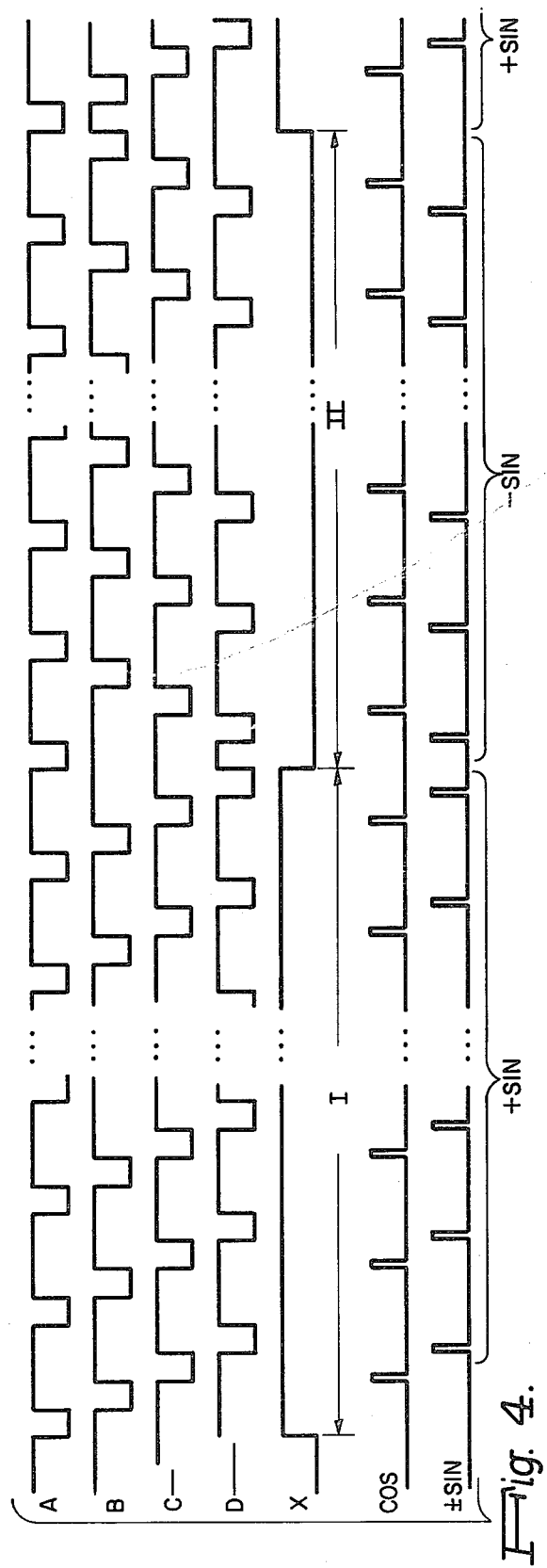
FIG. 4 shows waveforms representative of signals in the receiver station of FIG. 3.

With this configuration, logic 65 produces the stub element drive waveforms A, B, C and D illustrated in the correspondingly referenced lines of FIG. 4, wherein the low levels of those signals activate the correspondingly identified antenna elements. The 27.3 Hz scan direction signal is denoted by the reference designation X in FIGS. 3 and 4 and controls the periodic reversal of the direction of scan for antenna 16.

The sync generator 30 is coupled to the decoder-driver logic 65 in a manner to provide a pulse coincidental with each fall time of the drive signal for antenna element C. This pulse train is identified by the designation COS in FIGS. 3 and 4 and provides the phase reference signal for phase demodulator 26. The COS signal represents the strobe pulse for the phase demodulator 26 which bears a fixed time relationship to the rotation of the pattern associated with the antenna 16.

Sync generator 30 also produces a pulse train which includes pulses coincident with the fall time of the drive signal for element D. This latter signal is identified by the designation +SIN or −SIN in FIGS. 3 and 4. During the time period when the antenna scan direction is clockwise as shown (sequence A, B, C, D), each pulse of the SIN signal is ahead of an associated COS pulse by one quarter of the antenna rotational period, thereby establishing the +SIN signal strobe pulse for demodulator 26. During the time period when the antenna scan direction is reversed (sequence D, C, B, A), each pulse of the SIN signal is behind an associated COS pulse by one-quarter of the antenna rotational period, thereby establishing the −SIN signal for strobing demodulator 26.

In the present embodiment, the phase demodulator 26 is a quad-bilateral switch, such as the CMOS type CD 4016AE, manufactured by RCA, Somerville, N.J., with the output from audio filter 24 being applied in non-inverted form to pins 4 and 1 of that integrated circuit, the output from audio filter 24 being applied in inverted form to pins 8 and 11, the COS signal being applied to pins 12 and 13 and the ±SIN signal being applied to pins 5 and 6. The output signals from pins 3 and 9 (denoted +S and −S) of the integrated circuit are complementary representations of the phase modulation during the counter-clockwise rotation of the antenna pattern, and the output signals from pins 10 and 2 (denoted +C and −C) are complementary representations of the phase modulation during the clockwise rotation of the antenna pattern.

The +S, −S and +C, −C signals are then applied to display 34 where the respective pairs of signals are integrated (to remove the 27.3 Hz components of those signals) and applied to the horizontal and vertical coils of a 360° d.c., continuous resolving-type display, such as the type 800 C, manufactured by Pilot Instrument Corporation, Waldoboro, Maine. In alternative embodiments, different type displays may readily be utilized in keeping with the present invention. By way of example, the phase modulated output from filter 24 may be applied first to a limiter and then to a differentiating network to form a pulse at every positive-going zero crossing. These pulses are then applied to the SET inputs of a set-reset flip flop. The phase reference signal pulses (i.e. the COS signal) are applied to the RESET input of that flip flop. The Q or $\overline{Q}$ output signals of the flip flop are alternately selected, depending on the current direction of antenna rotation, and the selected output signal is then averaged to its d.c. value and applied to either an analog or digital voltmeter (calibrated 0°–360°) to provide a bearing indication.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:
1. A radio direction finding system comprising:
  A. an antenna system including a transmitting antenna and associated radio transmitter at a first reference location and a receiving antenna and associated radio receiver at a second location, one of said antennas being characterized by an omnidirectional antenna pattern and the other being characterized by a directional antenna pattern,
  B. means to rotate said pattern of said directional antenna, wherein the direction of rotation is periodically reversed at a rate relatively low compared to the rate of rotation, said rotation means including an associated means to generate a direction signal representative of the direction of rotation of said pattern and a phase reference signal, said phase reference signal being periodic at a multiple of the rate of rotation of said pattern and bearing a fixed time relation thereto,
  C. demodulator means coupled to said receiver, said demodulator being responsive to signals received from said transmitter, and to said direction of rotation signal and said phase reference signal, to generate a first demodulated signal representative of the modulation on said received signal due to said rotation of said pattern when said pattern rotates in a first direction, and to generate a second demodulated signal representative of the modulation on said received signal due to said rotation of said pattern when said pattern rotates in the direction opposite to said first direction, and D. means to combine said first and second demodulated signal and generate a bearing signal, said bearing signal being representative of the bearing of said first location relative to said second location.

2. The system according to claim 1 wherein said rotating antenna is an electronically switched multi-element array.

3. The system according to claim 1 wherein said demodulator includes a phase demodulator responsive to said phase reference signal, said received signal and said direction of rotation signal.

4. The system according to claim 1 wherein said transmitting antenna is characterized by said omni-directional antenna pattern and said receiving antenna is characterized by said directional antenna pattern.

5. The system according to claim 1 wherein said transmitting antenna is characterized by said directional antenna pattern and said receiving antenna is characterized by said omni-directional antenna pattern.

* * * * *